United States Patent Office 3,563,998
Patented Feb. 16, 1971

3,563,998
2 - [4 - (2',6' - DIPHENYL - 4 - PYRIDYL)PHENOXY]-
AND 2 - [4 - (4',6' - DIPHENYL - 2 - PYRIDYL)PHE-
NOXY] LOWER ALIPHATIC MONOCARBOCYLIC
ACIDS AND ESTERS
Rudolf G. Griot, Florham Park, N.J., assignor to Sandoz-
Wander, Inc., a corporation of Delaware
No Drawing. Filed July 8, 1968, Ser. No. 743,041
Int. Cl. C07d 31/34
U.S. Cl. 260—295          7 Claims

ABSTRACT OF THE DISCLOSURE

Aliphatic acid derivatives, e.g., 2-[4-(2',6'-diphenyl-4-pyridyl)phenoxy]-, and 2-[4-(4',6'-diphenyl - 2 - pyridyl) phenoxy] lower aliphatic monocarbocylic acids. These compounds are useful as hypolipidemic agents.

This invention relates to derivatives of aliphatic acids. In particular the invention pertains to 2-[4-(2',6'-diphenyl-4-pyridyl)-phenoxy]-, and 2-[4-(4',6'-diphenyl-2-pyridyl) phenoxy] lower aliphatic monocarbocylic acids and the corresponding lower alkyl esters. The invention also relates to intermediates useful in preparing said acids and esters as well as processes for preparing said intermediates and said acids and esters.

The substituted aliphatic acids and esters of the present invention may be represented structurally as follows:

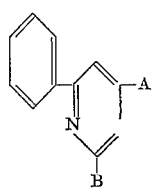

wherein A and B are dissimilar and represent phenyl or the radical

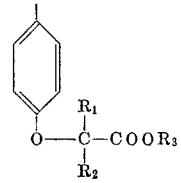

wherein each of $R_1$ and $R_2$ independently represents hydrogen or straight chain lower alkyl preferably containing from 1 to 4 carbon atoms, i.e., methyl, ethyl, propyl, and butyl; and $R_3$ represents hydrogen or straight or branched chain lower alkyl preferably containing from 1 to 4 carbon atoms, e.g., methyl, ethyl, propyl, isopropyl or butyl.

The invention thus includes compounds of formulae

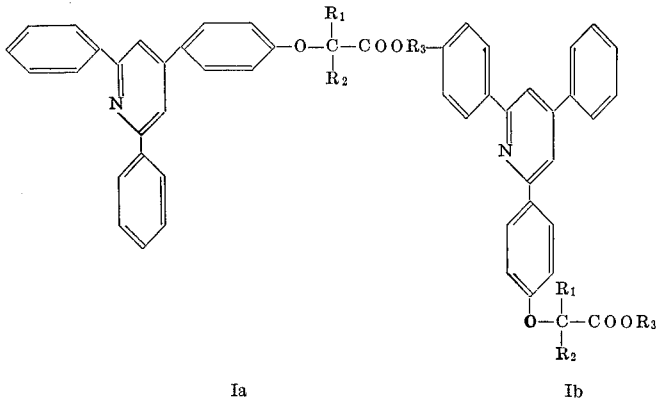

Ia                    Ib wherein $R_1$, $R_2$ and $R_3$ have the above significance.

The compounds of Formula I are most conveniently prepared by reacting an alkali-metal salt of 4-(2',6'-diphenyl-4-pyridyl)phenol or 4-(4',6'-diphenyl-4-pyridyl) phenol with an appropriate 2-halo substituted aliphatic acid or ester as illustrated by the following reaction schemes:

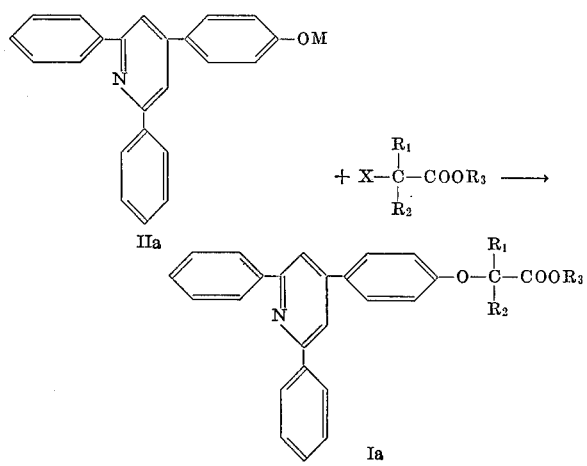

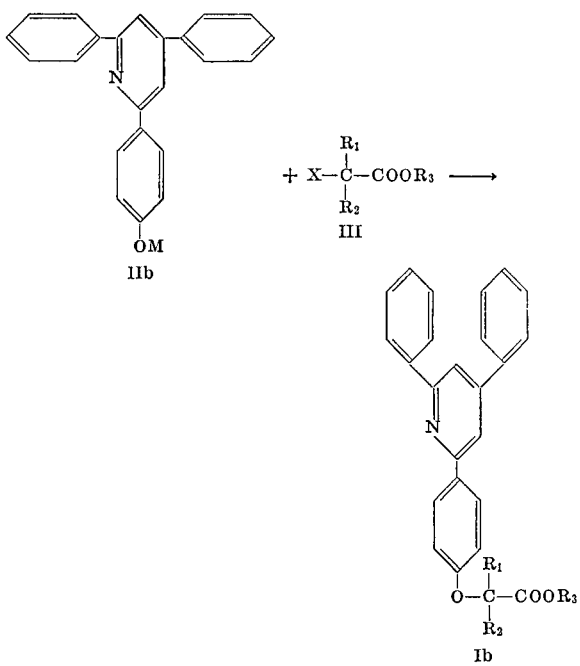

wherein $R_1$, $R_2$ and $R_3$ are as defined, X represents halogen having an atomic weight of from 35 to 127, i.e., chloro, bromo and iodo, and M represents an alkali-metal preferably sodium or potassium.

The above process is conveniently carried out in an inert organic solvent and at elevated temperatures. Preferably the reaction is carried out at a temperature of from about 20° C. to about 130° C. and in the same solvent employed for the preparation of the alkali-metal salt derivative of Formula II from the corresponding phenol discussed in further detail hereinafter. The resulting products (I) are readily recovered in conventional manner.

It will be readily appreciated by one skilled in the art that the compounds of Formula I wherein $R_3$ is hydrogen, i.e., the free acids, may also be obtained from the corresponding esters of Formula I (i.e., where $R_3$ is alkyl) by simple basic hydrolysis of the ester in conventional manner. The hydrolysis is conveniently carried out by treating the ester with an alcoholic solution of an alkali-metal hydroxide, e.g., potassium hydroxide in methanol.

Various of the 2-halo substituted alkanoic acids and esters of Formula III employed in the above-illustrated process are known and can be prepared by methods described in the literature. Such others which may not be specifically described in the literature can be prepared from available material in analogous manner.

Compounds IIa and IIb are conveniently prepared by reacting the corresponding phenols with an alkali-metal hydride, e.g., sodium hydride or potassium hydride, at room temperature (20–25° C.) in an inert substantially anhydrous organic solvent. Suitable solvents include dimethylacetamide, diethylacetamide and dimethylformamide. As previously indicated hereinabove the solvent employed in preparing the phenolate is preferably employed in carrying out the subsequent reaction of the phenolate IIa or IIb with the appropriate 2-halo substituted alkanoic acid or ester (III). The phenols IIa and IIb are known compounds and have been described by W. Dilthey in J. Prakt. Chem. 102, 209 (1921).

The compounds of Formula I are useful because they possess pharmacological activity in animals. In particular, the compounds are useful as hypolipidemic agents having hypocholesteremic and/or hypotriglyceridemic activity, as indicated by tests on a group of white rats which are given 10–50 mg. per kg. of body weight per diem of the compound orally, for six days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964): (Technicon method N 24a): and Kessler, G., and Lederer; H. Technicon Symposium, Mediad Inc., New York, pp. 345–347 (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about .4 gram of the compound, and the dosage forms suitable for internal use comprise from about 12.5 milligrams to about 200 milligrams of active compound in intimate admixture with a solid or liquid pharmaceutically acceptable carrier or dilutent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents, and preserving agents, in order to provide an elegant and palatable preparation. Tablets may contain the active ingredients in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract thereby provide a sustained action over a longer period. Similarly, suspensions, syrups and elixirs may contain the active ingredient in admixture with any of the conventional excipients utilized for the preparation of such compositions, e.g., suspending agent (methylcellulose, tragacanth and sodium alginate), wetting agents (lecithin, polyoxyethylene stearate and polyoxyethylene sorbitan monooleate) and preservatives (ethyl-p-hydroxy-benzoate). Capsules may contain the active ingredient alone or admixed with an inert solid dilutent, e.g., calcium carbonate, calcium phosphate and kaolin. The preferred pharmaceutical compositions from the standponit of preparation and ease of administration are solid compositions, particularly hardfilled capsules and tablets.

The compounds of Formula I wherein $R_3$ is hydrogen (i.e. free acids) may be similary administered in the form of their non-toxic pharmaceutically acceptable salts. Such salts do not materially differ from the free acid forms in their pharmacological effect and are included within the scope of the invention. As illustrative of such salts there may be included aluminum salt; non-tonic alkali metal salts, e.g., potassium and sodium salts; non-toxic alkaline earth metal salts, e.g., magnesium and calcium salts; salts with N-containing bases such as ammonium salts and pharmaceutically acceptable primary, secondary and tertiary amine salts, e.g., ethanol amine salts, diethanol amine salts, and the like. Such salts are prepared in conventional manner.

A representative formulation is a tablet prepared by conventional tabletting techniques and containing the following ingredients:

| Ingredient: | Weight (mg.) |
|---|---|
| 2-Methyl-2-[4 - (2',6' - diphenyl-4 - pyridyl) phenoxy]propionic acid | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

2-methyl-2-[4-(2',6'-diphenyl-4'-pyridyl)phenoxyl propionic acid ethyl ester 32.6 g. of 2,6-diphenyl-4-p-hydroxyphenylpyridine are added at room temperature to a suspension of 4.8 g. of sodium hydride (50%) in 200 ml. of dimethylformamide and stirred until all the hydride has reacted. To the resulting sodium salt of the above phenol, 20 g. of ethyl bromoisobutyrate are added and the mixture heated to 100° C. on a waterbath for 24 hours. The solvent is then evaporated in a vacuum, the residue taken up in ether and consecultively extracted with 200 ml. of water, 200 ml. of 5% acetic acid, 200 ml. of water and 200 ml. of a saturated sodium bicarbonate solution. After drying over magnesium sulfate, the ether is evaporated to yield 2-methyl - 2 - [4 - (2',6' - diphenyl-4'-pyridyl)phenoxy]-propionic acid ethyl ester.

EXAMPLE 2

2-methyl-2-[4-(4',6'-diphenyl-2'-pyridyl)-phenoxy] propionic acid ethyl ester 32.6 g. of 2-p-hydroxyphenyl-4,6-diphenylpyridine are added at room temperature to a suspension of 4.8 g. of sodium hydride (50%) in 200 ml. of dimethylformamide and stirred until all the hydride has reacted. To the resulting sodium salt of the above phenol, 20 g. of ethyl bromoisobutyrate are added and the mixture heated to 100° C. on a waterbath for 24 hours. The solvent is then evaporated in a vacuum, the residue taken up in ether and consecutively extracted with 200 ml. of water, 200 ml. of 5% acetic acid, 200 ml. of water and 200 ml. of a saturated sodium bicarbonate solution. After drying over magnesium sulfate, the ether is evaporated to yield 2-methyl-2 - [4 - (4',6' - diphenyl - 2' - pyridyl)-phenoxy]propionic acid ethyl ester.

EXAMPLE 3

2-methyl-2-[4-(2,6-diphenyl-4-pyridyl) phenoxy]-propionic acid 9 g. of 2-methyl-2-[4-(2',6'-diphenyl-4'-pyridyl)phenoxy]propionic acid ethyl ester are dissolved in a solution of 2.0 g. of potassium hydroxide in 40 ml. methanol and left at room temperature for 3 days. The solvent is then evaporated in vacuo, the residue dissolved in water, extracted twice with 50 ml. ether and treated with exactly 36.0 ml. of a 1 N hydrochloric acid. The product is extracted with 3× 50 ml. of diethylether, the organic phase washed with 50 ml. of a saturated sodium chloride solution and then dried over magnesium sulfate. Evaporation of the solvent yields 2-methyl-2-[4-(2,6-diphenyl-4-pyridyl)phenoxy]-propionic acid.

EXAMPLE 4

2-methyl-2-[4-(4,6-diphenyl-2-pyridyl) phenoxy]propionic acid 9 g. of 2-methyl-2-[4-(4',6'-diphenyl-2'-pyridyl)-phenoxy]propionic acid ethyl ester are dissolved in a solution of 2.0 g. of potassium hydroxide in 40 ml. methanol and left at room temperature for 3 days. The solvent is then evaporated in vacuo, the residue dissolved in water, extracted twice with 50 ml. ether and treated with exactly 36.0 ml. of a 1 N hydrochloric acid. The product is extracted with 3× 50 ml. of diethylether, the organic phase washed with 50 ml. of a saturated sodium chloride solution and then dried over magnesium sulfate. Evaporation of the solvent yields 2-methyl-2-[4-(4,6-diphenyl-2-pyridyl)phenoxy] pripionic acid.

What is claimed is:

1. A compound of formula

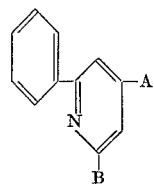

wherein A and B are dissimilar and represent phenyl or the radical

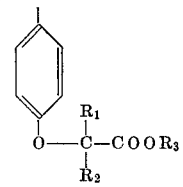

wherein each of $R_1$ and $R_2$ independently represents hydrogen or straight chain lower alkyl of 1 to 4 carbon atoms and $R_3$ represents hydrogen or straight or branched chain lower alkyl of 1 to 4 carbon atoms, or when $R_3$ represents hydrogen, the pharmaceutically acceptable salts thereof.

2. A compound of claim 1 which is

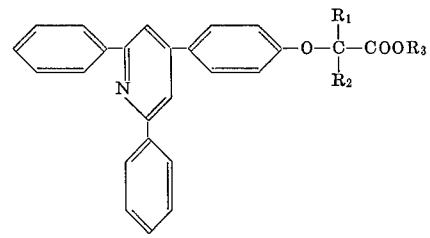

wherein each of $R_1$ and $R_2$ independently represents hydrogen or straight chain lower alkyl and $R_3$ represents hydrogen or straight or branched chain lower alkyl or, when $R_3$ represents hydrogen, the pharmaceutically acceptable salts thereof.

3. A compound of claim 1 which is

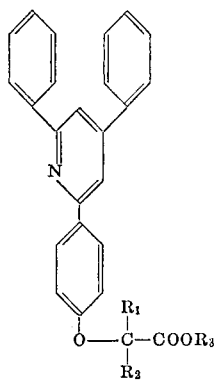

wherein each of $R_1$ and $R_2$ independently represents hydrogen or straight chain lower alkyl and $R_3$ represents hydrogen or straight or branched chain lower alkyl or, when $R_3$ represents hydrogen, the pharmaceutically acceptable salts thereof.

4. A compound of claim 1 which is 2-methyl-2-[4-(2', 6' - diphenyl - 4' - pyridyl)phenoxy]propionic acid ethyl ester.

5. A compound of claim 1 which is 2-methyl-2-[4-(4', 6' - diphenyl - 2' - pyridyl)-phenoxy]propionic acid ethyl ester.

6. A compound of claim 1 which is 2-methyl-2-[4-(2,6 - diphenyl - 4 - pyridyl)phenoxy]-propionic acid or a pharmaceutically acceptable salt thereof.

7. A compound of claim 1 which is 2-methyl-2-[4-(4, 6 - diphenyl - 2 - pyridyl)phenoxy]propionic acid or a pharmaceutically acceptable salt thereof.

No references cited.

ALAN L. ROTMAN, Primary Examiner

U.S. Cl. X.R.

260—270; 424—266